INVENTORS T. M. BUCK
M. H. CROWELL
E. I. GORDON
BY
Roderick B. Anderson
ATTORNEY 3,403,284

TARGET STRUCTURE STORAGE DEVICE USING DIODE ARRAY

Thomas M. Buck, Basking Ridge, Merton H. Crowell, Morristown, and Eugene I. Gordon, Convent Station, N.J., assignors to Bell Telephone Laboratories, Incorporated, Berkeley Heights, N.J., a corporation of New York Filed Dec. 29, 1966, Ser. No. 605,715
12 Claims. (Cl. 315—11)

This invention relates to light sensitive storage devices, and more particularly, to television camera tubes having semiconductor target structures.

The patent of Reynolds, 3,011,089 issued Nov. 28, 1961, and assigned to Bell Telephone Laboratories, Incorporated, describes a light sensitive storage device that can be used as a television camera tube. Like conventional camera tubes, the Reynolds device uses a scanning electron beam; but unlike conventional tubes, which use an evaporated uniform layer of semi-insulating material as the photosensitive target, its target structure is a flat n-type semiconductor substrate maintained at a fixed potential with respect to the tube cathode and having an array of isolated p-type regions on the target surface each of which forms a junction diode with the substrate. Light is admitted to the semiconductor from the side opposite the scanning electron beam. By successively depositing electrons on each p-type region of the target surface and charging it to cathode potential, the scanning beam reverse-biases each successive diode segment to a voltage equal to the difference in potential of the substrate and the cathode. In the absence of light and the scanning beam, the initial reverse-bias voltage would decay slowly as a function of time due to leakage current across the junction.

Light impinging on the n-type substrate immediately adjacent to the diode considerably increases the junction current by photon production of hole-electron pairs. As the beam again scans the p-type surface, charging it again to cathode potential, the charge it deposits on each of the p-type regions equals the charge removed by the junction current during the preceding frame period. This charge in turn is dependent on the localized light intensity to which that segment of the semiconductor has been subjected. As the junction capacitances of the diodes are successively recharged by the electron beam, charge flows from an external circuit to the semiconductor substrate. The instantaneous value of this current corresponds to the ratio of the restored charge to the recharging time of the diode which is approximately equal to the time the beam spends on the diode; over a frame period, the current varies in proportion to the spatial distribution of the light intensity on the scanned area of the semiconductor and constitutes the video output signal.

When used as a television camera tube, the primary advantage of Reynolds' device is that the semiconductor materials that can be used for making the target diode array, such as silicon, have great reliability compared to those normally used in camera tubes such as antimony trisulfide (vidicon) or lead oxide (plumbicon) and are compatible with vacuum tube fabrication techniques. On the other hand, the use of a diode array target has several drawbacks. First, the substrate must be quite thin to insure that photon excited minority carriers or holes can diffuse to the p-n junction before recombining with electrons. The distance over which minority carriers can diffuse increases with their lifetime; but attaining long lifetimes imposes stringent requirements on the processing techniques. The device is difficult to fabricate, not only because of the thin substrate, but because the beam is intended to impinge successively on single p-type regions.

For accurate information storage and transmission, all the diodes should be identical and the beam should be in proper registration with the array of p-type regions as it scans the target surface. As will become clearer later, there are also other inherent problems of sensitivity, resolution, and spurious output current.

Accordingly, it is an object of this invention to provide improved light sensitive storage device that can be used as television camera tubes.

This and other objects of the invention are attained in an illustrative embodiment thereof comprising an improved television camera tube of the general type described in the Reynolds patent. A target surface of an n-type semiconductor contains an array of p-type regions which is repetitively scanned by an electron beam. The opposite side of the semiconductor is exposed to incoming light which induces current across the p-n junctions as described before. As a result, different p-n diodes manifest varying degrees of discharge resulting in a fluctuating current in the semiconductor as the beam scans successive p-type regions recharging them to the full target voltage. This fluctuating current is taken as the video output and is indicative of the optical energy to which successive diodes have been exposed during one frame period.

In accordance with one feature of the invention, the p-type regions are made sufficiently small with respect to the cross-sectional area of the electron beam that, as the beam scans the target surface, it impinges on a plurality of p-type regions simultaneously. By thus increasing the number of p-type regions included on the target surface, the effects of individual diode variability or failure are reduced. Moreover, a continuous video output is generated even if the beam is not precisely registered with respect to the diode array; in fact, the requirement of beam registration as described before is substantially eliminated.

According to another feature, the p-type regions are insulated from each other and the n-type substrate is shielded from the beam by an insulating coating that exposes only the p-type regions to the beam. This feature prevents electron beam generation of spurious current in the output circuit which would otherwise result from bombardment of the substrate.

In accordance with still another feature, a conductive matrix is overlayed on the target surface insulator film which is biased positively to drain electrons from the insulator. In the absence of this feature, electrons which accumulate on the insulator may cause inversion in the n-type substrate which would result in undesirable leakage current and impaired resolution.

In accordance with one embodiment of the invention, a conductive contact which overlays the target surface insulative coating is bonded to each p-type region. Each of these contacts is insulated from adjacent contacts and from the conductive matrix and effectively increases the area of capacitive coupling between each p-type region and the n-type substrate. The resulting increased junction capacitance increases device sensitivity as will be explained more fully later.

It is another feature of this invention that a thin transparent conductive film, which is insulated from the semiconductor by a transparent insulative film, be included over the light-admitting surface of the semiconductor. The conductive film is biased at a positive voltage with respect to the semiconductor, its purpose being to repel positively charged holes that are formed by light impingement on the semiconductor. This reduces recombination of hole-electron pairs at the surface of the semiconductor by repelling the holes toward the depletion region of the p-n junction, and thereby increases the sensitivity of the device. It also allows electronic control of the sensitivity and can be used for automatic gain or target control. Sensitivity is further enhanced by including between the conductive film and the insulative film a coating of anti-reflection material which increases the proportion of light absorbed by the semiconductor.

In present television camera tubes, the target is biased at a sufficiently low voltage to yield a secondary emission ratio of less than 1. We have found that resolution can be improved by biasing the semiconductor target at a voltage that is much higher and which yields a true secondary emission ratio of more than 1. In one embodiment, the substrate is made of p-type material with the target surface regions being of n-type material. As before, the electron beam reverse-biases various diodes as it scans the target surface, but in this case, reverse-bias is accomplished by removing electrons from the n-type regions rather than by depositing electrons on the p-type regions. This embodiment is additionally advantageous because the minority carrier diffusion length in the p-type substrate is typically larger than the diffusion length of minority carriers in an n-type substrate.

In still another embodiment, the substrate is n-type as before, but a secondary electron collector closely adjacent the target surface is biased at a slightly lower voltage than the semiconductor. Although the true secondary emission ratio of the semiconductor is greater than 1, the effective secondary emission ratio is less than 1 because of returning secondary electrons that are repelled by the secondary electron collector. Again, the electron beam velocity is high for improving resolution.

In still another embodiment, the target surface diodes are formed by alloying or evaporating metal contacts to the semiconductor substrate. Each metal contact forms with the substrate a Schottky barrier diode; a junction is formed between the metal and the semiconductor having a leakage current which is modulated by incoming light energy in the same manner as described before. This embodiment offers advantages of ease of fabrication which may for some purposes make it preferable.

These and other objects, features and advantages of our invention will be better understood from a consideration of the following detailed description, taken in conjunction with the accompanying drawing in which.

Figure 1:
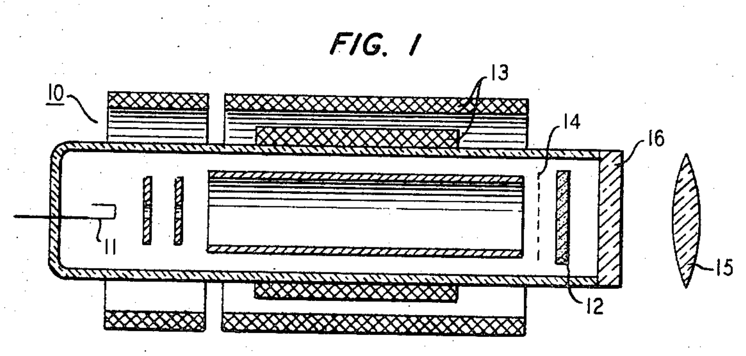
FIG. 1 is a schematic illustration of a television camera tube in accordance with one embodiment of the invention.

FIG. 1 shows a television camera tube 10 comprising a cathode 11 for forming and projecting an electron beam toward a target structure 12. Coils 13 deflect the electron beam in a known manner so that it scans a target surface on the target structure 12 in a line and frame sequence. Secondary electrons from the target surface are collected by a secondary electron collector grid 14. A lens 15 projects incoming light through a transparent face plate 16 and images it on a light admitting surface of the target structure 12. As will become clearer from the discussion below, the purpose of television camera tube 10 is to convert incoming light into electrical energy in the form of a charge pattern, to store the charge pattern for a sufficient period of time to permit the electron beam to scan the target surface, and to transmit in the form of a video output signal information representative of the stored image.

Figure 2:
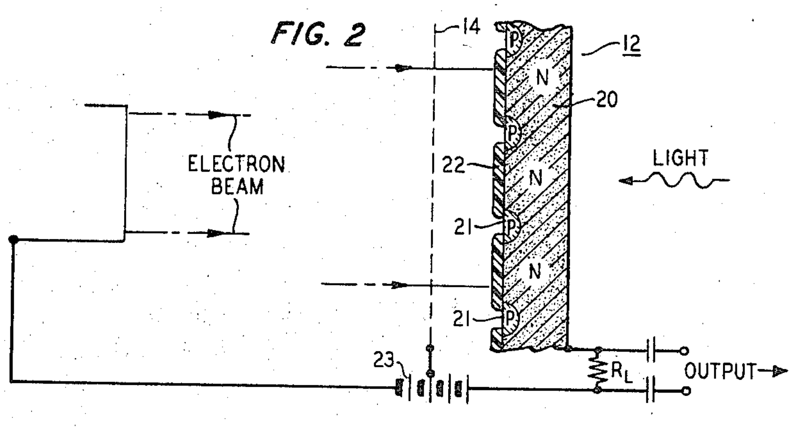
FIG. 2 is an enlarged view of part of the apparatus of FIG. 1.

FIG. 2 shows one embodiment of the invention in which the target structure 12 comprises a semiconductor wafer the major portion of which is an n-type substrate 20 with isolated p-type regions 21 forming a mosaic along the target surface of the semiconductor. Coating 22 of insulator material covers the entire target surface side of the n-type substrate and exposes only the p-type regions to the electron beam. The substrate 20 is connected to a load resistance $R_L$ which is in turn connected to a battery 23 that maintains it at a positive potential with respect to the cathode.

As the electron beam scans the target surface, it deposits electrons on the p-type regions which reverse-biases each of the individual diodes. In the absence of any light impingement, this bias voltage would decay slowly due to unavoidable leakage current across the junction of each diode. However, when the substrate 20 is illuminated, incoming photons produce hole-electron pairs in the substrate which can add measurably to the charge flow across the junction and thereby increase the rate of discharge or reverse-bias voltage decay. Hence, after some finite period of time, the voltage profile due to the charge distribution of the diode array is a function of the light intensity to which each diode has been subjected, and therefore to the spatial distribution of light intensity. When the electron beam again scans the target surface, the electron charge it deposits on each p-type region equals the charge leakage during the preceding frame period. The beam impingement causes a surge of current from the battery 23 to the substrate 20 equal to the recharging current of the diode junction, which is indicative of the light intensity to which that junction has been subjected. This current surge creates a voltage across $R_L$ which is taken as the output video signal as shown in the drawing.

In accordance with the invention, each p-type region 21 is made with a much smaller diameter than the diameter of the electron beam so that as the electron beam scans the target surface it impinges simultaneously on several p-type regions. The insulator coating 22 prevents current surges through the resistor $R_L$ due to impingement on the n-type substrate, which would generate spurious output signals. We have found that it is practical to make the p-type regions of about 8 microns in diameter with center-to-center spacings of about 20 microns between the p-type regions in both the length and width dimensions. Then, with a beam of typically 1 mil (25 microns) in diameter, several diodes will be impinged simultaneously by the beam.

This design has several advantages. First, because there are so many diodes, the camera tube is more tolerant to fabrication variations or failures of individual diodes. Secondly, smaller diodes have a smaller dark current; i.e., a smaller leakage current across the junction in the absence of any light. This tends to increase the ratio of light to dark current since the light current is less dependent on junction area; the quality of the reproduced image increases with increase in the light to dark current ratio. Third, this construction eliminates the necessity for registering the beam with respect to the target structure; in other words, there is no need to align the beam to ensure that it scans the p-type regions rather than scanning only areas between p-type regions. Even though the output line includes D-C blocking capacitors, the insulative coating is required to eliminate spurious video output signals which would result from beam impingement on the substrate. These spurious signals would seriously impair the quality of the transmitted signals.

Figures 3, 4:
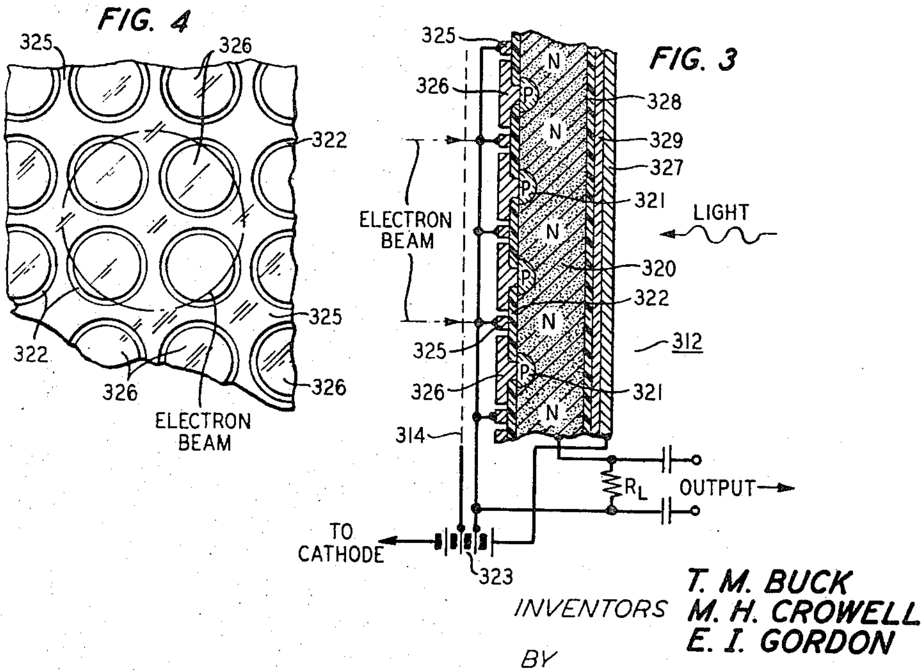
FIG. 3 is an enlarged view of part of a target structure of a television camera tube in accordance with another embodiment of the invention.
FIG. 4 is a side view of the target structure of FIG. 3.

The embodiment of FIGS. 3 and 4 includes several additional features which constitute improvements on the embodiment of FIG. 2. In FIG. 2, impingement of the beam on the insulator 22 charges the exposed surface of the insulator to the potential of the electron beam cathode. The resulting negative charge may create an inversion layer which would increase the junction leakage current. Inversion layers are described in the "Proceedings of the I.R.E.," vol. 42, page 1376 (1954) by A. L. McWhorter and R. H. Kingston. Leakage between adjacent p-type regions tends to impair device resolution, while increased leakage current across the junction of each diode reduces device sensitivity and the storage time of each diode.

In the device of FIGS. 3 and 4, in which elements analogous to those of FIG. 2 have the same reference numerals plus 300, a matrix conductor 325 which surrounds each of the diodes is included on the surface of the insulator 322. The conductor 325 is biased by battery 323 at a positive voltage so that the insulator 322 cannot attract positively-charged holes of the substrate 320 and produce an inversion layer as described before.

While making the p-type regions 321 small is advantageous for the reasons given above, a reduction in the diameter of the p-type regions reduces the capacitance across each diode junction as well as the leakage current. This in turn may reduce the time constant of voltage decay across the junction and therefore the storage time of the diode. In accordance with the invention, metal contacts 326 are bonded to each of the p-type regions and overlap the insulator 322. These contacts have a substantially larger diameter than the diameter of the p-type regions to which they are connected and therefore increase the capacitance between each p-type region and the n-type substrate. It is of course important that each of the contacts 326 is insulated from adjacent contacts and from the matrix conductor 325.

Another problem in designing the embodiment of FIG. 2 is to insure that a sufficient number of holes resulting from photon absorption diffuse to the junction of each diode to modulate the current across the junction as described before. If the substrate 320 is made thick enough to be self-supporting, the diode junctions may be so far removed from the light admitting surface of the substrate that holes produced near that surface recombine before reaching the junction. One approach to this problem is to treat the substrate 320 in a known manner to increase the lifetime of minority carriers by reducing imperfections in the bulk semiconductor material to reduce the number of recombination centers. Recombination centers are locations at which holes recombine with electrons; such recombination of course reduces the hole current available at the diode junction.

It can be shown that a very significant region of recombination in the substrate 320 is the light admitting surface. Recombination at this surface can be reduced by treating the surface with hydrofluoric acid to make it more n-type than the remainder of the substrate. The resulting change in surface potential tends to repel the holes and therefore to reduce the recombination velocity. Other chemical treatments which could be used include boiling in de-ionized water and soaking in dichromate solution. This renders the surface p-type and repels electrons required for recombination. For an explanation of this phenomenon, see the "Journal of the Electrochemical Society," vol. 105, page 709 (1958), by T. M. Buck and F. S. McKim.

In the embodiment of FIG. 3, recombination is reduced by providing a thin transparent conductive film 327 that is coextensive with the substrate and insulated from the substrate by an insulator film 328. The conductive film 327 is biased at a positive voltage with respect to the substrate by the battery 323 as shown. The positive voltage on the conductor 327 attracts electrons of the n-type substrate to the light admitting surface of the substrate and reduces the surface recombination velocity by repelling photogenerated holes toward the diode junctions.

For a device having sensitivity in the visible and near infra-red part of the spectrum, the target structure of FIGS. 2 and 3 is typically made as follows: n-type silicon, 15 mils thick, is optically polished and etched on one side, and oxidized on the other side to form a layer of silicon dioxide in which an array of apertures 8 microns in diameter, 20 microns center-to-center, is etched. Boron is diffused into the exposed areas of the substrate at 1140° C. to form the p-type regions, with the oxide layer acting as a diffusion mask. Subsequently, the oxide layer constitutes insulator coating 22 of FIG. 2 or 322 of FIG. 3. The battery contact to the substrate should be an ohmic contact preferably made around the periphery of the substrate wafer. The silicon substrate is durable, is able to withstand the high temperatures incident to vacuum tube outgasing, and does not deteriorate or change its characteristics from relatively intense exposure either to incoming light or the electron beam.

Insulator films such as $SiO_2$ may have very fine pinhole defects which are undesirable in this application because (a) they provide a path for electrons to the n-type silicon and cause bright spots in the transmitted image and (b) in the structure of FIG. 3, for example, they could short-circuit any of the metal members 326, 325, or 327 to the n-type silicon. Pinholes often appear in $SiO_2$ films after removal, by etching, of the boron and phosphorous glass which forms during diffusion of p-type and n-type regions for junctions and ohmic contacts.

In order to seal up pinholes which result from glass removal or any other reason, a second insulator film can be deposited over the first. Such a second film could consist of silicon dioxide, silicon nitride, aluminum oxide, or beryllium oxide. There are numerous ways of depositing these films at both high and low temperatures. When the film is deposited over the diode array, new holes can be opened over the p-regions by photolithography.

Another material which could be used for the second film is $MnO_2$. This material is conducting as deposited but when a high voltage is applied across it, defects in the first film are healed, apparently by the formation of reduced oxides such as $Mn_3O_4$ or $Mn_2O_3$ which have higher resistivity, or by oxidation of the substrate. In either case, the $MnO_2$ remains conducting in regions other than at the defects, and so it can be used as the matrix conductor 325.

With a frame rate of 30 frames per second, the area of each junction and the area of the contacts 326 of FIG. 3 should be adjusted to give a diode capacitance of between 800 and 5000 picofarads per square centimeter. This will give each diode a time constant that is consistent with the frame rate for commercial television, but which can be modulated by incoming light. The insulator coating 328 of FIG. 3 should preferably be in the range of .3 to .5 micron thick for optimum compatibility with the antireflection coating and sufficient electrical insulation. The conductive coating 327 should be .01 to .02 micron thick to be transparent and additionally should be bonded by an ohmic contact. The antireflection coating 329 is preferably a film of zinc sulfide approximately one-fourth of a wavelength thick, or for visible light, approximately, .06 micron thick. The antireflection coating may be included on the substrate, on the insulator 328 as shown, or over the conductor 327, but in any case it should be located at a distance of less than 1 micron from the surface of the substrate. With a zero voltage on the cathode, the substrate may be biased to a potential of plus 5 to 10 volts, the secondary electron collector at plus 300 volts, the matrix conductor 325 at plus 5 to 10 volts, and the transparent conductor 327 at plus 5 to 20 volts.

Figure 5:
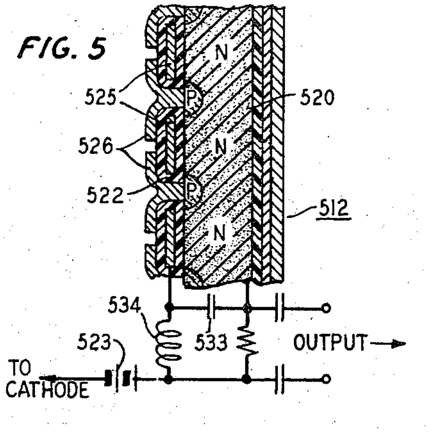
FIG. 5 is a schematic view of part of the target structure of a television camera tube in accordance with another embodiment of the invention.

FIG. 5 shows a target structure 512 in which diode capacitance is further increased by overlapping the metal contacts 526 over the grid conductor 525. The grid conductor in turn is completely enveloped by the insulator coating 522. Besides permitting larger area contacts, this feature removes the inherent restriction of the FIG. 3 device that each leg of the grid conductor be narrower than the separation distance between adjacent metal contacts. It can be appreciated, however, that, with a relatively large area grid conductor 525 overlapped by the contacts 526, a substantial diode capacitance is created between the metal contacts and the grid conductor. The video signal in the grid conductor resulting from recharging of the diode by the electron beam is coupled to the output line by a capacitor 533 and is added to the output signal from the substrate 520. A choke inductance 534 restricts the video signal to the output circuit.

In the embodiments described thus far, it has been assumed that the ratio of secondary electron emission from the p-type regions is less than 1. This limits the velocity of the electron beam because if the electron beam velocity is too large, the secondary emission ratio of the target surface will be more than 1 and electrons will be removed, rather than deposited, by the scanning electron beam. The velocity of the beam impinging on the target surface, and therefore the secondary emission ratio, is a function of the positive voltage of the target surface as indicated by curve 31 of FIG. 7. Hence, the substrate 20 of FIG. 2 and the substrate 320 of FIG. 3 are biased at a voltage below the "cross-over" voltage CO of FIG. 7 at which the secondary emission ratio is equal to 1. We have found, on the other hand, that if the substrate were biased at a higher positive voltage, the beam velocity at impingement would be higher, the beam would be better defined, and in most cases, resolution would be increased.

Figure 6:
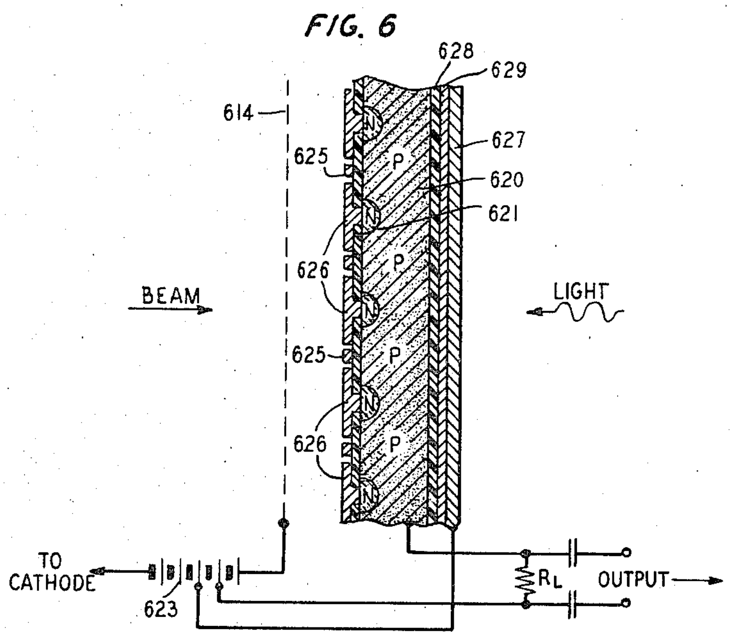
FIG. 6 is a schematic view of part of a target structure in accordance with another embodiment of the invention.

The target structure depicted in FIG. 6 operates in accordance with the same principle as that of FIG. 3 and includes elements of the 600 series that correspond in function to the elements of the 300 series of FIG. 3. The semiconductor substrate 620 is made of p-type material with the target surface regions 621 being of n-type material, the entire semiconductor being biased by battery 623 at a voltage above the voltage CO of FIG. 7 but slightly less than the secondary collector voltage to give it a secondary emission ratio of more than 1. Since in the embodiment of FIG. 6 the beam actually impinges on the metal contacts 626 rather than on the semiconductor, the secondary emission ratio referred to is that of the contacts rather than of the semiconductor to which they are bonded. Hence, as the electron beam sweeps the target surface, electrons are removed from the contacts and the whole array is charged up to the secondary electron collector voltage. The secondary electrons are collected by secondary electron collector 614, and the various diodes are again reverse-biased. The junction current of the diodes results from the transfer of holes from the n-type regions to the p-type substrate and electrons from the p-type substrate to the n-type regions. Photon excited current discharges the diodes as before so that, as the beam returns, the voltage on successive contacts 626 is a function of the light to which the diodes have been exposed.

In addition to permitting a higher velocity electron beam, the embodiment of FIG. 6 is sometimes advantageous because the diffusion length of minority carriers in p-type material is generally greater than that of n-type material. As a consequence, a greater proportion of the photon generated minority carriers in the substrate will reach the junctions of the various diodes and, at least under some conditions the embodiment of FIG. 6 will be more sensitive that that of FIGS. 2 or 3. The transparent conductive film 627 is preferably biased at a more negative potential than that of the substrate since photogenerated electrons, rather than photogenerated holes, are to be repelled toward the junctions to discharge the diode in proportion to the light intensity. It is to be understood, however, that a positive potential can also be used to repel holes which would also reduce recombination velocity. With a zero voltage on the cathode the following voltages are typical: target voltage $V_T$, 50 to 200 volts; secondary electron collector voltage ($V_T$ plus 5 to 10 volts); transparent conductor voltage, ($V_T$ minus 5 to 10 volts); and the matrix conductor voltage ($V_T$ plus or minus 5 to 10 volts).

Figure 7:
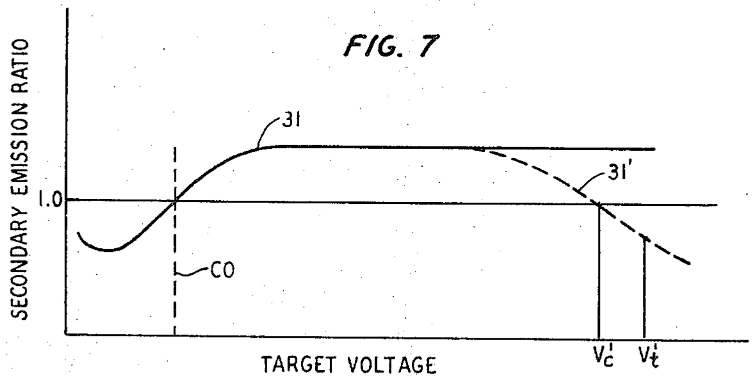
FIG. 7 is a graph of target suface secondary emission ratio versus voltage of the target structure of FIG. 5.

It is possible also to use a high electron beam velocity in the embodiments of FIGS. 2 and 4 if the target voltage is higher than the voltage on the secondary electron collector 614. Referring to FIG. 7, assume that the semiconductor target voltage is $V_T'$ with respect to a voltage on the secondary collector $V_C'$. Since the secondary electron collector voltage is more negative than that of the target, a repelling electron field is established and some of the secondary electrons will be returned to the target. As a result, although the true secondary emission ratio of the target is greater than 1, because of its high positive voltage with respect to the secondary electron collector, the effective secondary emission ratio will be less than 1; after the beam has scanned each diode, more electrons will be deposited on the diode than are removed. This effective secondary emission ratio is depicted by the dotted curve 31' of FIG. 7. Note that when the target voltage is equal to the collector voltage $V_C'$, the effective secondary emission ratio is equal to 1, but if the target voltage is greater than $V_C'$, the secondary emission ratio is less than 1. Hence, a high velocity electron beam may be used in the embodiments of FIGS. 2 and 3 provided that the voltage of the secondary electron collector is smaller than that of the target, whereas, in the embodiment of FIG. 6, the voltage of the secondary electron collector should be larger than that of the target. In FIGS. 2 and 3 with a cathode voltage of zero volts, the target voltage $V_T'$ may be 50 to 200 volts, the secondary electron collector voltage $V_C'$ may be ($V_T'$ minus 5 to 10 volts), and the transparent conductor voltage $V_T'$ plus 5 to 10 volts).

Figure 8:
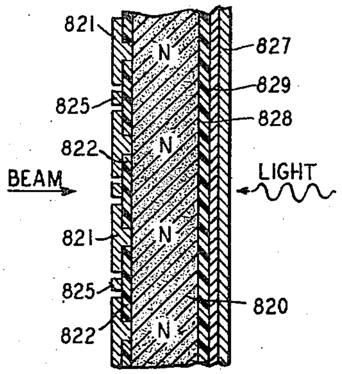
FIG. 8 is a schematic view of the target structure of a television camera tube in accordance with still another embodiment of the invention.

FIG. 8 shows still another alternative embodiment of the invention in which a mosaic array of metal contacts 821 are bonded to an n-type substrate 820 so as to form an array of Schottky rectifying barrier diodes along the target surface. There are no diffused p-type regions. An insulator 822 is included to shield the entire substrate from the electron beam, while a matrix conductor 825 discharges electrons from the insulator. As before, the diodes are reverse-biased by the electron beam with photon-generated minority carriers modulating the rectifying barrier current. If so desired, the substrate may be of p-type material provided that the electron beam gives a secondary emission ratio which is greater than 1 as described before. The barrier contacts may be made in various known ways such as by evaporating gold onto the substrate.

In summary, our invention includes a number of features which can be used in any of a number of different combinations. The embodiment of FIG. 2 is directed only to the use of diodes which are of much smaller diameter and separated by a smaller distance than the diameter of the electron beam, together with an insulator coating for shielding the substrate from the beam. The embodiment of FIG. 3 illustrates the features of draining electrons from the target surface insulator coating, increasing the junction capacitances of the diodes by using metal contacts over each p-type region, using an antireflection coating on the light emitting surface, and using a transparent conductor for reducing the recombination velocity at the light emitting surface. The embodiment of FIG. 5 shows how diode capacitance can be further increased, while maximizing video output. The discussion accompanying FIGS. 6 and 7 describes how the voltage on the target affects its secondary emission ratio, how a p-type substrate with n-type surface regions can be used, and how a high velocity electron beam for giving higher resolution can be used in the embodiments of FIG. 6 and those of FIGS. 2 and 3. FIG. 8 illustrates that metal contacts can be used for forming the required rectifying diode array.

Which of the embodiments shown, and which combination of the various features described is preferable, will depend largely on the requirements of the television camera tube to be fabricated. Moreover, while these various features have been described in the context of a television camera tube, it is intended that they may be employed in other electron beam devices such as the information storage devices described in the Reynolds patent. Various other embodiments and modifications may be made by those skilled in the art without departing from the spirit and scope of the invention.

What is claimed is:

1. In an electron beam storage device, the combination comprising:

a target structure comprising a semiconductive wafer the major portion of which is of a first conductivity type;

the semiconductive wafer including on a first surface thereof an array of regions, each of the regions defining with the major portion of the wafer a p-n junction;

means for reverse-biasing the p-n junctions comprising means for periodically scanning the target structure with an electron beam;

and means for shielding the portion of the wafer of the first conductivity type from the electron beam comprising a coating of insulating material over that part of the first surface of the wafer that is of the first conductivity type.

2. The storage device of claim 1 wherein:

the diameter of each region of the second conductivity type, plus the separation distance between adjacent regions is smaller than the diameter of the electron beam, whereby the electron beam simultaneously reverse-biases a plurality of rectifying barriers.

3. The electron beam storage device of claim 1 further comprising:

means comprising a conductor on the surface of the insulator coating which is biased at a higher positive voltage than the voltage of the wafer for discharging electrons from the insulator coating.

4. The electron beam storage device of claim 1 further comprising:

an array of metal contacts each of which is bonded to one of the regions of the second conductivity type;

each of the contacts also overlapping part of the insulator coating and having a larger surface area than the surface area of the second conductivity type region to which it is bonded, thereby increasing the capacitance across each of the p-n junctions.

5. The electron beam storage device of claim 1 further including an insulator coating on a second surface of the wafer which is substantially parallel to the first surface;

a transparent conductive coating overlaying the transparent insulator coating;

the conductive coating being biased at a voltage which repels minority carriers in the wafer portion of the first conductivity type.

6. The electron beam storage device of claim 1 wherein:

the secondary emission ratio of the portion of the target structure impinged by the electron beam is less than 1;

the first conductivity type is n-type;

and the second conductivity type is p-type.

7. The electron beam storage device of claim 1 wherein:

the secondary emission ratio of the portion of the target structure impinged by the beam is greater than 1;

the first conductivity type is p-type;

and the second conductivity type is n-type.

8. The electron beam storage device of claim 1 wherein:

the first conductivity type is n-type;

the second conductivity type is p-type;

the semiconductor is biased at a sufficiently high positive voltage to give a true secondary emission ratio of greater than 1 to that part of the target structure impinged by the electron beam;

and further comprising a secondary electron collector in close proximity to the first surface which is biased at a lower positive voltage than that of the target structure, whereby some electrons are repelled from the secondary electron collector to the target structure to give the target structure an effective secondary emission ratio of less than 1.

9. The electron beam storage device of claim 4 further comprising:

means comprising a matrix conductor on the insulator coating which is biased at a higher positive voltage than the voltage of the semiconductor for discharging electrons from the insulator coating.

10. The electron beam storage device of claim 9 wherein:

each of the metal contacts overlaps part of the matrix conductor;

and the matrix conductor and the semiconductor are both coupled to an output circuit, whereby video signal currents in the matrix conductor are added to those of the semiconductor.

11. In combination;

a target structure comprising a semiconductive wafer, the wafer including adjacent one surface thereof an array of discrete rectifying barriers surrounded by regions free of rectifying barriers;

insulating means coating said surface selectively at portions overlying regions free of rectifying barriers and leaving exposed portions overlying the rectifying barriers;

means for forming and projecting an electron beam for scanning said one surface of the wafer;

and means for projecting an image to be recorded on the surface of the wafer opposite the one surface.

12. The electron beam storage tube of claim 11 wherein:

the array of rectifying barriers are defined by an array of metal contacts forming with the semiconductive wafer an array of Schottky barrier diodes.

References Cited

UNITED STATES PATENTS 3,322,955 5/1967 Desvignes -------- 250—211 X

RODNEY D. BENNETT, *Primary Examiner.*

D. C. KAUFMAN, *Assistant Examiner.*